(12) United States Patent
Chang (10) Patent No.: US 7,209,191 B2
(45) Date of Patent: Apr. 24, 2007

(54) TRANSFLECTIVE LIQUID CRYSTAL DISPLAY

(75) Inventor: Wei-Chih Chang, Hsinchu (TW)

(73) Assignee: TPO Displays Corp., Miao-Li County (TW)

( * ) Notice: Subject to any disclaimer, the term of this patent is extended or adjusted under 35 U.S.C. 154(b) by 20 days.

(21) Appl. No.: 10/462,496

(22) Filed: Jun. 16, 2003

(65) Prior Publication Data

US 2004/0085498 A1 May 6, 2004

(30) Foreign Application Priority Data

Nov. 5, 2002 (TW) ................................ 91132623 A (51) Int. Cl.
*G02F 1/1343* (2006.01)
*G02F 1/1335* (2006.01)

(52) U.S. Cl. ........................................ 349/38; 349/114

(58) Field of Classification Search ................ 349/141, 349/38, 114
See application file for complete search history.

(56) References Cited

U.S. PATENT DOCUMENTS

| 5,717,474 A | 2/1998 | Sarma |
| 6,195,140 B1* | 2/2001 | Kubo et al. .................... 349/44 |
| 6,501,519 B2* | 12/2002 | Ha et al. ....................... 349/43 |

FOREIGN PATENT DOCUMENTS

| JP | 2003-057369 | 2/2003 |
| JP | 2003-270654 | 9/2003 |

* cited by examiner

*Primary Examiner*—Dung T. Nguyen (57) ABSTRACT

A liquid crystal display is provided. The liquid crystal display includes a common electrode, a liquid crystal layer, a data line, a transmissive electrode, a reflective electrode, an auxiliary electrode and a dielectric layer. The transmissive electrode is electrically connected to the data line and defines a first capacitor device along with the liquid crystal layer and the common electrode. The reflective electrode defines a second capacitor device along with the liquid crystal layer and the common electrode. The auxiliary electrode is electrically connected to the transmissive electrode. The dielectric layer is disposed between the auxiliary electrode and the reflective electrode and defines a third capacitor device along with the auxiliary electrode and the reflective electrode. The third capacitor device is electrically connected to the second capacitor device in series.

11 Claims, 14 Drawing Sheets

TRANSFLECTIVE LIQUID CRYSTAL DISPLAY

FIELD OF THE INVENTION

The present invention relates to a liquid crystal display, and more particularly to a structure of a transflective liquid crystal display.

BACKGROUND OF THE INVENTION

Liquid crystal displays (LCDs) are widely used in portable televisions, laptop personal computers, notebooks, electronic watches, calculators, mobile phones and office automation devices due to their advantages of small size, light weight, low driving voltage, low power consumption and good portability.

LCDs are generally classified as two major types: transmissive LCDs and reflective LCDs. A transmissive LCD requires backlight, while a reflective LCD reflects environmental light. So far, reflective LCDs are relatively popular. Since the reflective LCDs require high levels of ambient light to be readable, they work very well in bright sunlight but do not perform well indoors. In order to perform well in low light environments, a so-called "transflective" LCD has been developed in recent years.

Figure 1A:
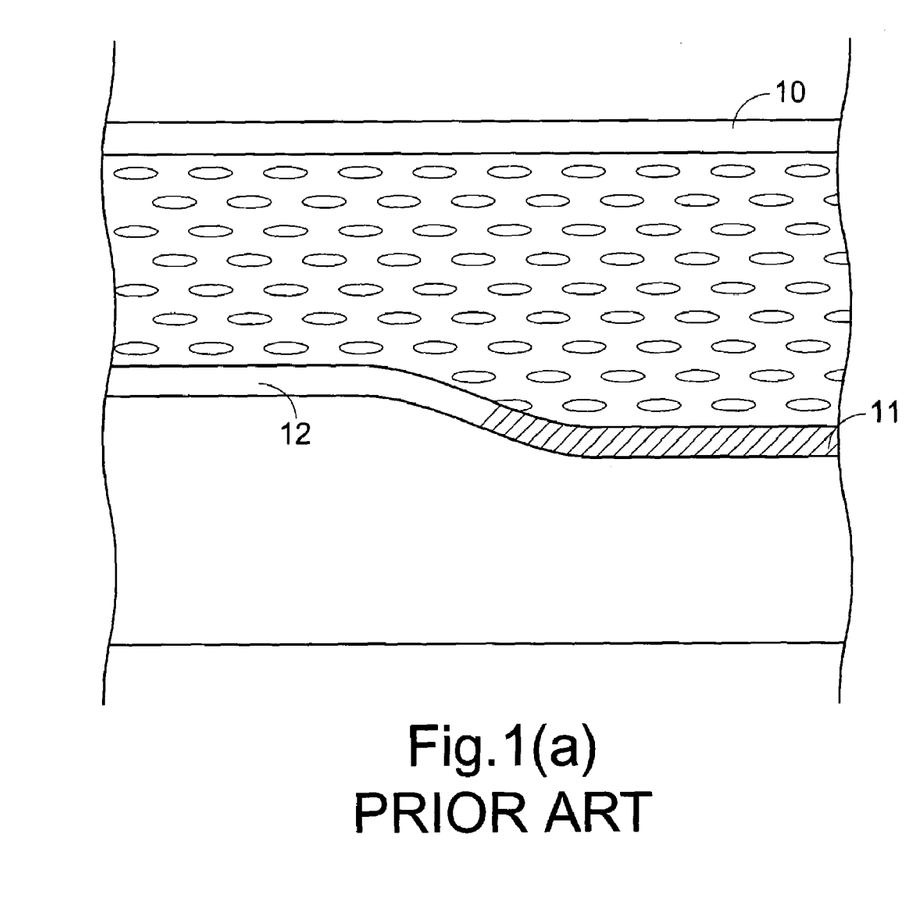
FIG. 1(a) schematically shows a partial cross-sectional structure of a conventional transflective liquid crystal display.
Figure 1B:
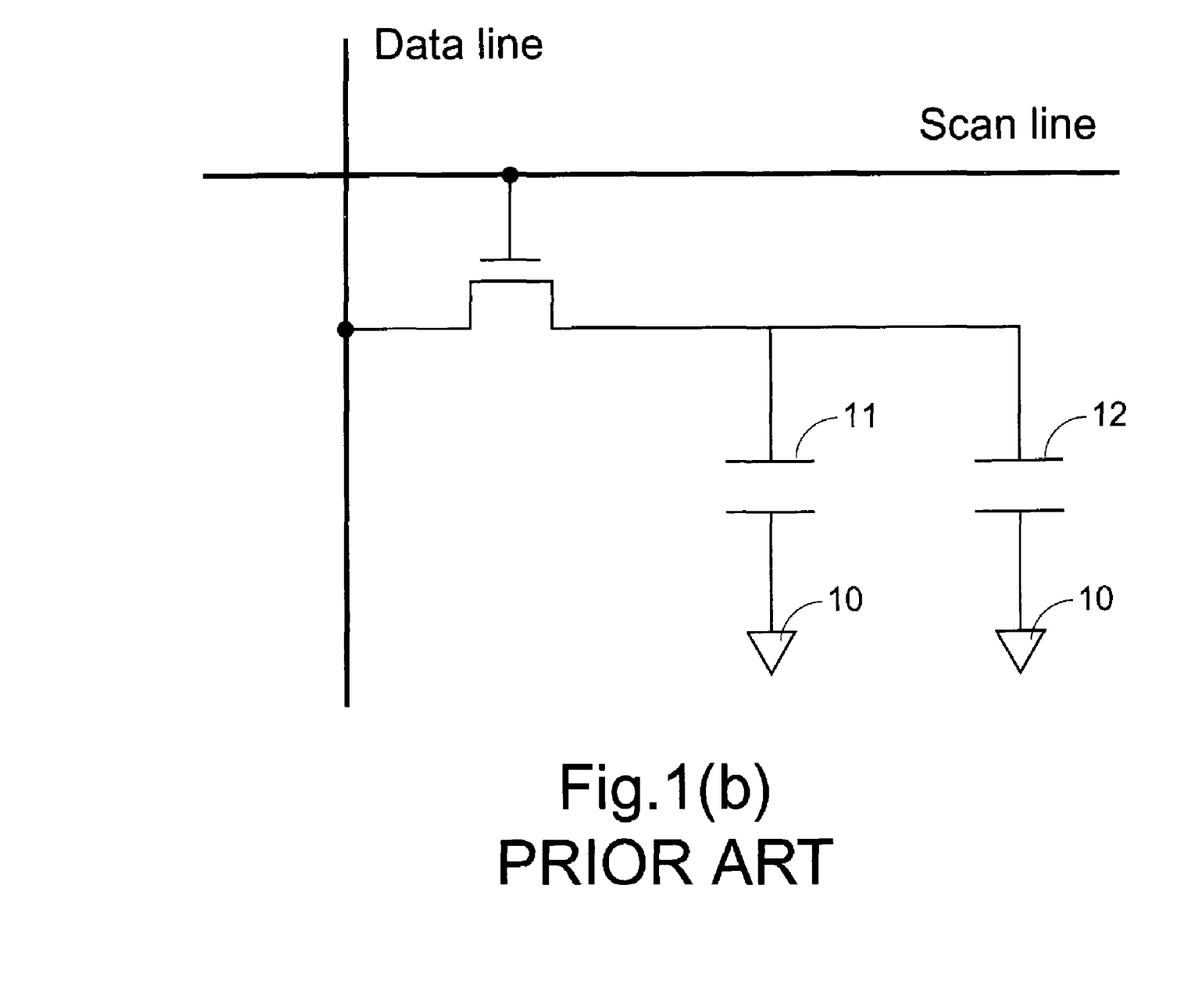
FIG. 1(b) is a schematic circuit diagram illustrating a cell of the transflective LCD in FIG. 1(a)

The transflective LCD is designed as a combination of the transmissive and the reflective designs. Please refer to the cross-sectional structure of FIG. 1(a). A pixel cell of a conventional transflective LCD comprises a common electrode 10, a transmissive electrode 11, a reflective electrode 12 and a liquid crystal layer 13. The liquid crystal layer 13 contains a plurality of liquid crystal molecules and is sandwiched between the common electrode 10, the transmissive electrode 11 and the reflective electrode 12. With such structure, each pixel cell of the transflective LCD can be referred to comprise two portions. One is a transmissive portion consisting of the common electrode 10, the liquid crystal layer 13 and the transmissive electrode 11, whereas the other one is a reflective portion consisting of the common electrode 10, the liquid crystal layer 13 and the reflective electrode 12. The liquid crystal molecules are aligned according to driving voltages applied between the electrodes. The light passing through the liquid crystal layer 13 is controlled accordingly. FIG. 1(b) is a schematic circuit diagram illustrating a cell of the transflective LCD shown in FIG. 1(a).

Figure 2A:
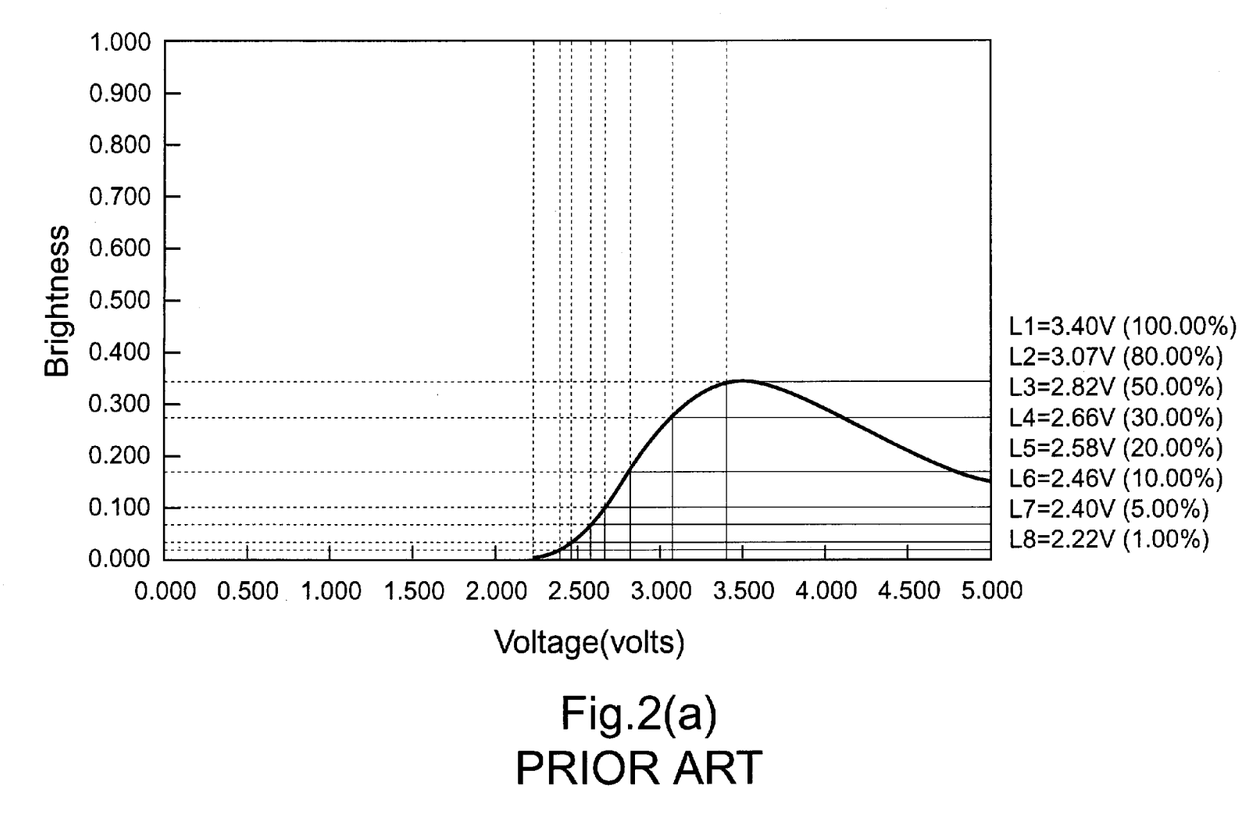
FIG. 2(a) is a brightness vs. voltage plot of the reflective portion of a conventional transflective LCD.
Figure 2B:
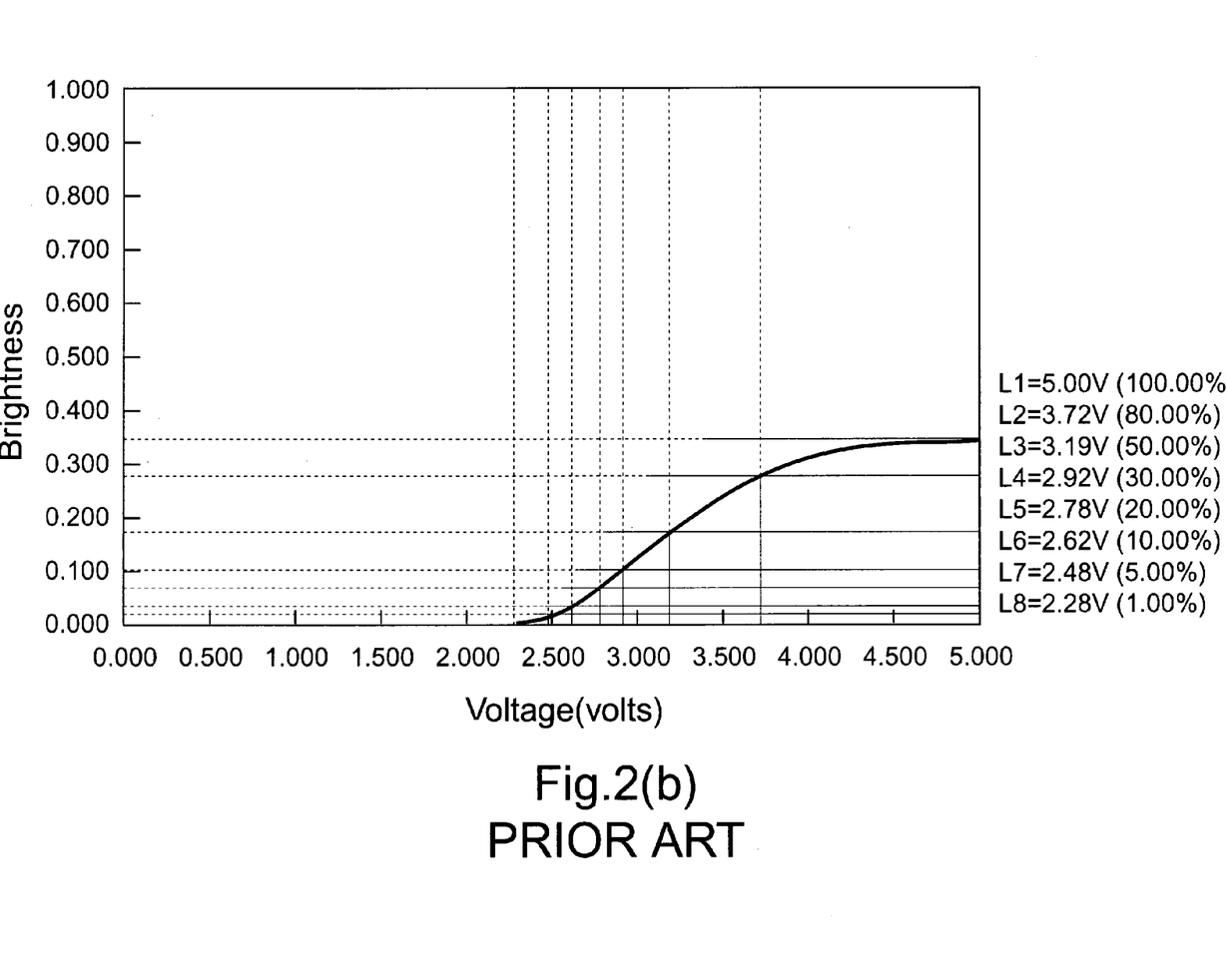
FIG. 2(b) is a brightness vs. voltage plot of the transmissive portion of a conventional transflective LCD.

FIGS. 2(a) and 2(b) are brightness vs. voltage plots of the reflective portion and the transmissive portion, respectively. As shown in FIG. 2(a), for the reflective portion, a maximum brightness is achieved at just about 3.5 volts of the applied voltage. Whereas, as shown in FIG. 2(b), the maximum brightness for the transmissive portion can be obtained when the applied voltage is approximately 5 volts. The symbols L1 in FIGS. 2(a) and 2(b) indicate a specific driving voltage giving a brightness index of 100%, while the symbols L2, L3, . . . indicate other driving voltages resulting in various brightness. It is understood from the figures while the driving voltages applied for the transmissive portion and the reflective portion are the same, the required operation voltages by the transmissive portion and the reflective portion, however, are different due to the difference in operation principles. Since the brightness varies with the driving voltages, different criteria for determining brightness levels and thus uneven brightness effects for the reflective portion and the transmissive portion are rendered.

SUMMARY OF THE INVENTION

It is an object of the present invention to provide a transflective liquid crystal display having a uniform brightness effect so as to enhance image quality of the liquid crystal display.

In accordance with an aspect of the present invention, there is provided a liquid crystal display. The liquid crystal display comprises a common electrode, a liquid crystal layer, a data line, a transmissive electrode, a reflective electrode, an auxiliary electrode and a dielectric layer. The liquid crystal layer comprises a plurality of liquid crystal molecules. The data line is used for transmitting a data voltage signal. The transmissive electrode is electrically connected to the data line and defines a first capacitor device along with the liquid crystal layer and the common electrode. The reflective electrode defines a second capacitor device along with the liquid crystal layer and the common electrode. The auxiliary electrode is electrically connected to the transmissive electrode. The dielectric layer is disposed between the auxiliary electrode and the reflective electrode and defines a third capacitor device along with the auxiliary electrode and the reflective electrode. The third capacitor device is electrically connected to the second capacitor device in series.

In an embodiment, the reflective electrode is made of a material selected from a group consisting of aluminum (Al), silver (Ag) and aluminum-neodymium (Al—Nd) alloy, and the transmissive electrode is made of a material selected from a group consisting of indium tin oxide (ITO) and indium zinc oxide (IZO).

In an embodiment, the auxiliary electrode is made of a material selected from a group consisting of indium tin oxide (ITO) and indium zinc oxide (IZO).

In an embodiment, the data line is electrically connected to the drain electrode of a thin film transistor and further to the transmissive electrode.

In an embodiment, the auxiliary electrode is integrally defined with the transmissive electrode.

In an embodiment, the auxiliary electrode is electrically connected to the transmissive electrode via a conducting line, and disposed at a side of the reflective electrode opposite to the common electrode.

In an embodiment, the auxiliary electrode is of a shape selected from one of a solid rectangle and a hollow ring.

In an embodiment, the reflective electrode is disposed over the transmissive electrode, and the auxiliary electrode is imbedded in the transmissive electrode and aligned with the reflective electrode.

In an embodiment, the liquid crystal display of the present invention further comprises a backlight disposed at a side of the transmissive electrode opposite to the liquid crystal layer.

In an embodiment, the liquid crystal display of the present invention further comprises a first transparent substrate disposed above the common electrode.

In an embodiment, the liquid crystal display of the present invention further comprises a second transparent substrate disposed under the transmissive electrode. A second aspect of the liquid crystal display according to the present invention relates to a common electrode; a liquid crystal layer comprising a plurality of liquid crystal molecules; a data line for transmitting a data voltage signal; a transmissive electrode defining a first capacitor device along with the liquid crystal layer and the common electrode; a reflective electrode electrically connected to the data line and defining a second capacitor device along with the liquid crystal layer and the common electrode; an auxiliary electrode electrically connected to the reflective electrode; and a dielectric layer disposed between the auxiliary electrode and the transmissive electrode and defining a third capacitor device along with the auxiliary electrode and the transmissive electrode. The third capacitor device is electrically connected to the first capacitor device in series.

In an embodiment, the auxiliary electrode is integrally defined with the reflective electrode.

In an embodiment, the auxiliary electrode is electrically connected to the reflective electrode via a conducting line, and disposed at a side of the transmissive electrode opposite to the common electrode.

In an embodiment, the auxiliary electrode is of a shape selected from one of a solid rectangle and a hollow ring.

Preferably, the auxiliary electrode is light transmissive.

In accordance with another aspect of the present invention, there is provided a liquid crystal display. The liquid crystal display comprises a TFT display unit, a scan line and a data line. The TFT display unit includes a transmissive capacitor zone working under a first operation voltage and a reflective capacitor zone working under a second operation voltage. The scan line is used for selectively driving the TFT display unit. The data line is used for transmitting a data voltage signal to the driven TFT display unit, wherein the data voltage signal is provided for both of the transmissive and reflective capacitor zones. Specifically, the TFT display unit further includes an auxiliary capacitor zone electrically connected to one of the transmissive and reflective capacitor zones, which works under a smaller operation voltage, in series. Preferably, the auxiliary capacitor zone and the one of the transmissive and reflective capacitor zones serially connected to each other are further electrically connected to the other of the transmissive and reflective capacitor zones in parallel.

In an embodiment, the transmissive capacitor zone is defined by a common electrode, a transmissive electrode and liquid crystal molecules sandwiched therebetween.

In an embodiment, the reflective capacitor zone is defined by the common electrode, a reflective electrode and liquid crystal molecules sandwiched therebetween.

In an embodiment, the first operation voltage is higher than the second operation voltage, and the auxiliary capacitor zone is defined by an auxiliary electrode, the reflective electrode and a dielectric layer sandwiched therebetween.

In an embodiment, the auxiliary electrode is integrally defined with the transmissive electrode.

In an embodiment, the auxiliary electrode is electrically connected to the transmissive electrode via a conducting line, and disposed at a side of the reflective electrode opposite to the common electrode.

In an embodiment, the reflective electrode is disposed over the transmissive electrode, and the auxiliary electrode is imbedded in the transmissive electrode and aligned with the reflective electrode.

In an embodiment, the liquid crystal display is a transflective liquid crystal display, and the transmissive and the reflective capacitor zones are a transmissive and a reflective zones, respectively.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 3A:
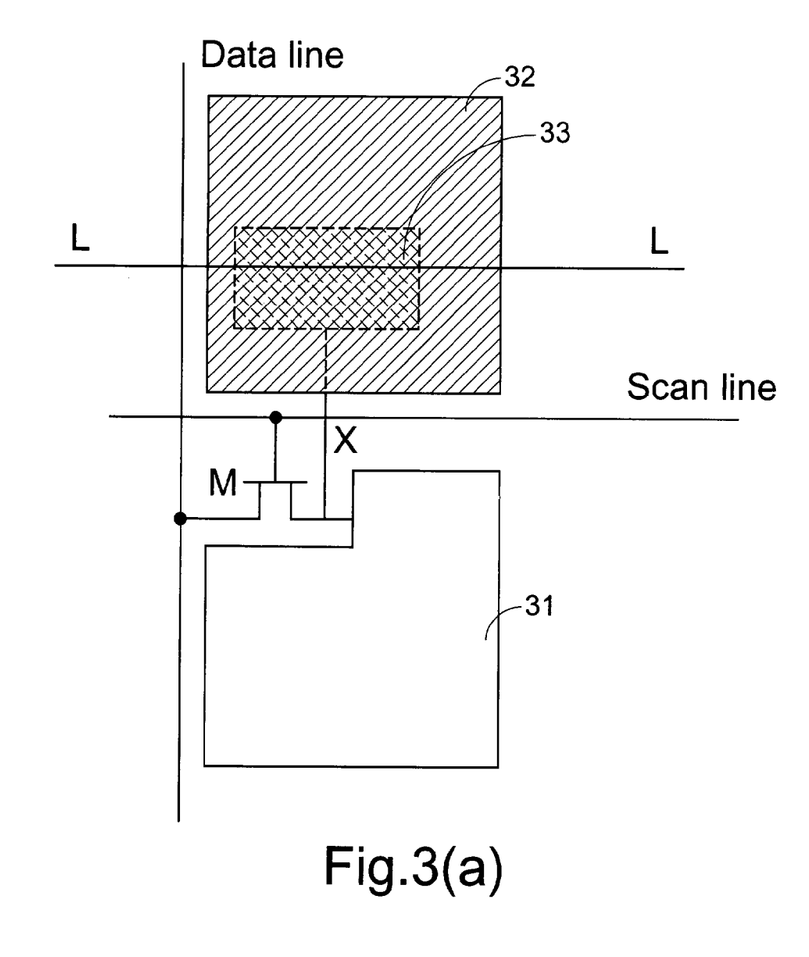
FIG. 3(a) is a schematic diagram showing a top plane view of a pixel cell of a transflective LCD according to a preferred embodiment of the present invention.
Figure 3B:
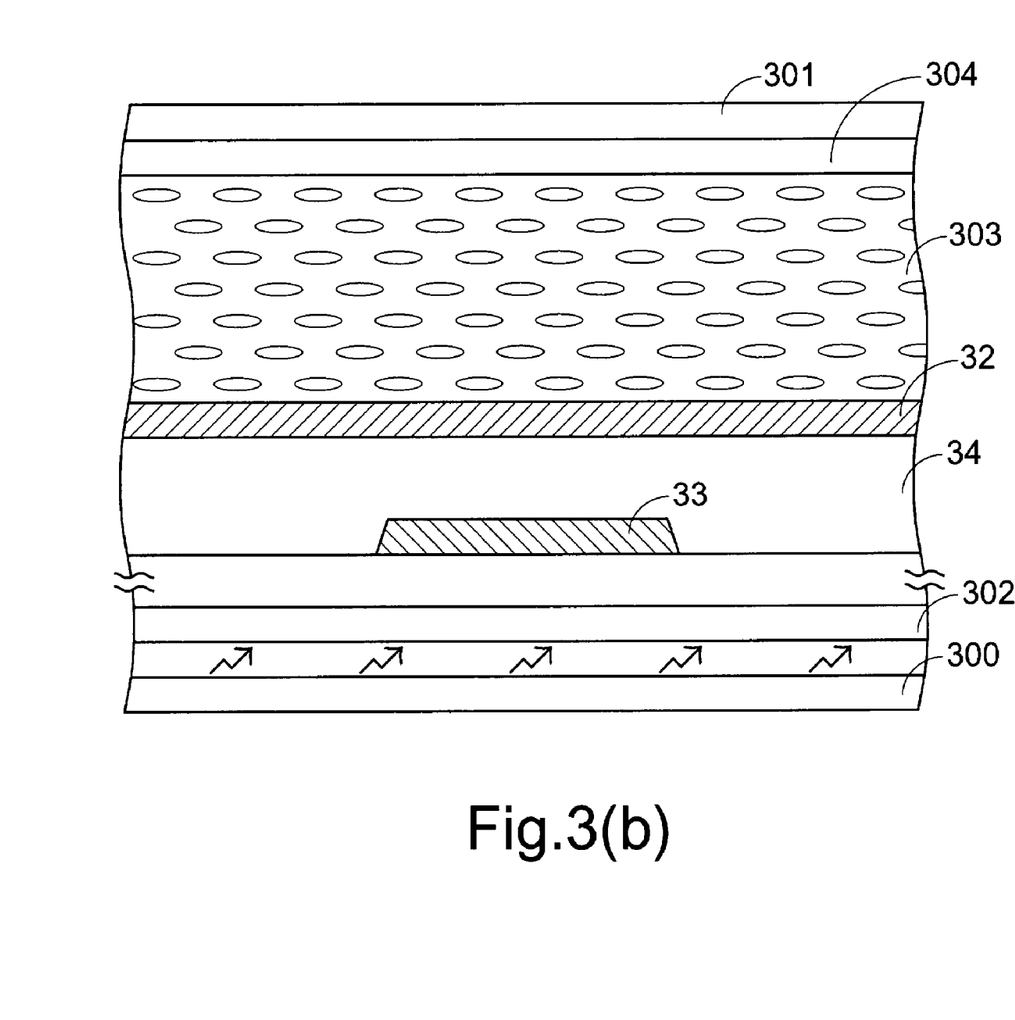
FIG. 3(b) is a cross-sectional view of the reflective portion in FIG. 3(a) taken along the line L—L.
Figure 3C:
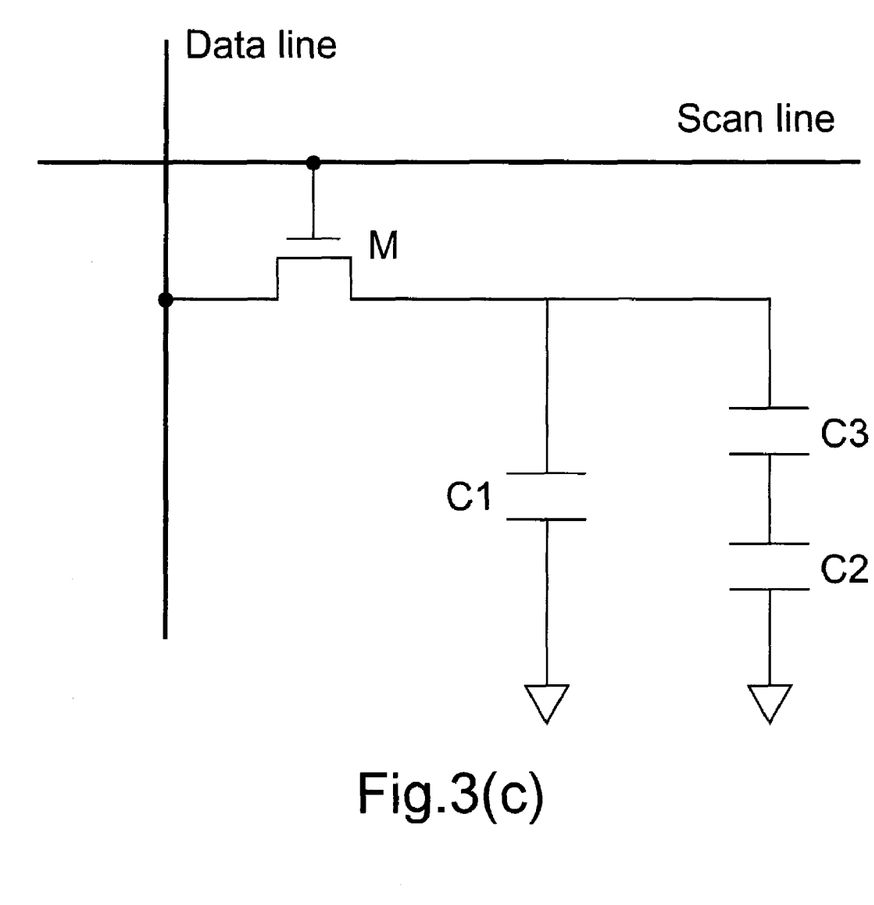
FIG. 3(c) is a schematic circuit diagram illustrating the configuration of the pixel cell implemented by the structures of FIGS. 3(a) and 3(b)

Please refer to FIG. 3(a)~3(c), which illustrate a pixel cell of a transflective LCD according to a preferred embodiment of the present invention. FIG. 3(b) is a cross-sectional view taken along the L—L line of FIG. 3(a), and FIG. 3(c) is a schematic circuit diagram of the pixel cell of FIG. 3(a).

The pixel cell of the transflective LCD comprises a data line, a scan line, a transmissive capacitor portion C1 and a reflective capacitor portion C2 disposed between an upper transparent substrate 301 and a lower transparent substrate 302. In addition, a backlight source 300 is disposed under the lower transparent substrate 302 for providing source light for the transmission-related zone. The data line is employed for transmitting a data voltage signal. Via the scan line, the thin film transistor (TFT) M is controlled in either a switching-on or switching-off state. The transmissive capacitor portion C1 comprises of a transmissive electrode 31 electrically connected to the data line, a common electrode 304 above the transmissive electrode 31, and liquid crystal molecules 303 sandwiched between the electrodes. The reflective capacitor portion C2 comprises the common electrode 304, the liquid crystal layer 303 and a reflective electrode 32. For the purpose of achieving a uniform brightness effect for the transflective LCD, an auxiliary capacitor device C3 is additional provided to be electrically connected to one of the transmissive capacitor device C1 and the reflective capacitor device C2, which works under a lower operation voltage, in series, and the serially connected combination is further electrically connected to the other, which works under a higher operation voltage, in parallel. In this embodiment, it is assumed that the operation voltage of the reflective capacitor device C2 is smaller than that of the transmissive capacitor device C1. Therefore, the auxiliary capacitor device C3 is electrically connected to the reflective capacitor device C2 in series and the combination of the capacitor devices C2 and C3 are further electrically connected to the transmissive capacitor device C1, as shown in FIG. 3(c).

In this embodiment, referring to FIG. 3(b), the auxiliary capacitor device C3 is defined by the reflective electrode 32, an auxiliary electrode 33, and a dielectric layer 34 between the electrodes. The auxiliary electrode 33 is formed on the lower transparent substrate 302 and connected to the transmissive electrode 31 via a conducting line X (FIG. 3(a)) so as to have a potential equal to the transmissive electrode 31.

Provided that the applied voltage is Vd, and these capacitor devices C1, C2 and C3 have capacitance values of Q1, Q2 and Q3, respectively, the voltage applied onto the transmissive capacitor device C1 is Vd, and the reflective capacitor device C2 has a divided voltage Vc2=Vd* Q2/(Q2+Q3). In other words, the voltage applied onto the reflective capacitor device C2 is adjusted to a lower level by means of the serial connection of the auxiliary capacitor device C3. Therefore, the voltages for driving the transmissive portion and the reflective portion are differently provided according to their operation voltages. For example, the applied voltages for the transmissive portion and the reflective portion can be adjusted to 5 volts and 3.5 volts, respectively, so as to obtain even brightness.

Figure 4A:
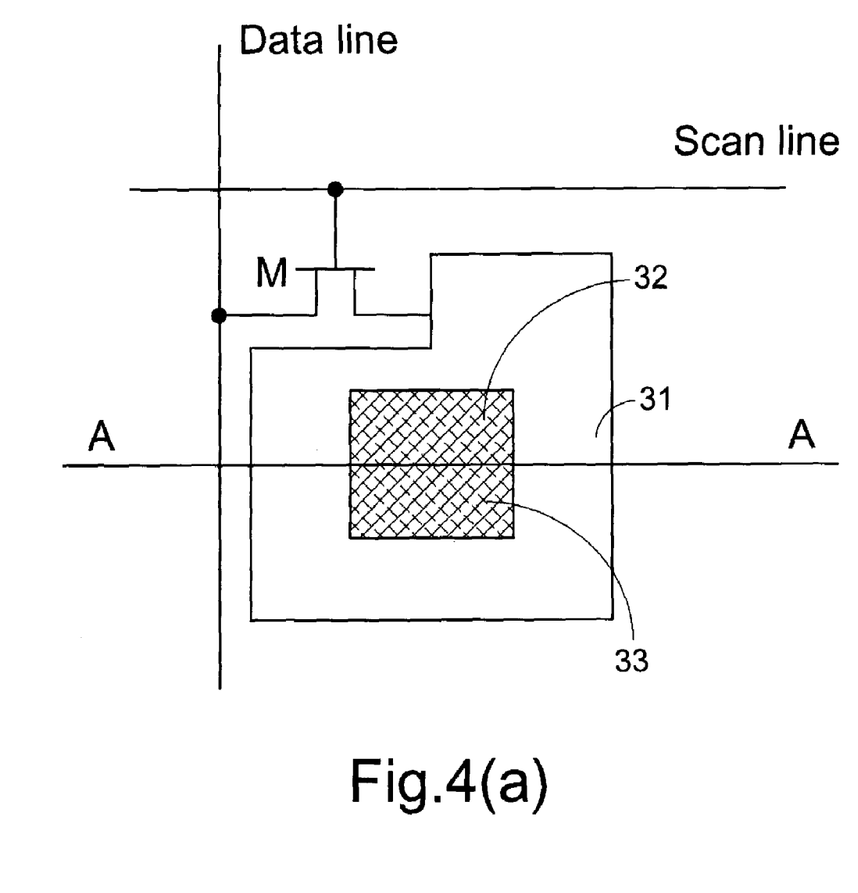
FIG. 4(a) is a schematic diagram showing a top plane view of a pixel cell of a transflective LCD according to another preferred embodiment of the present invention.
Figure 4B:
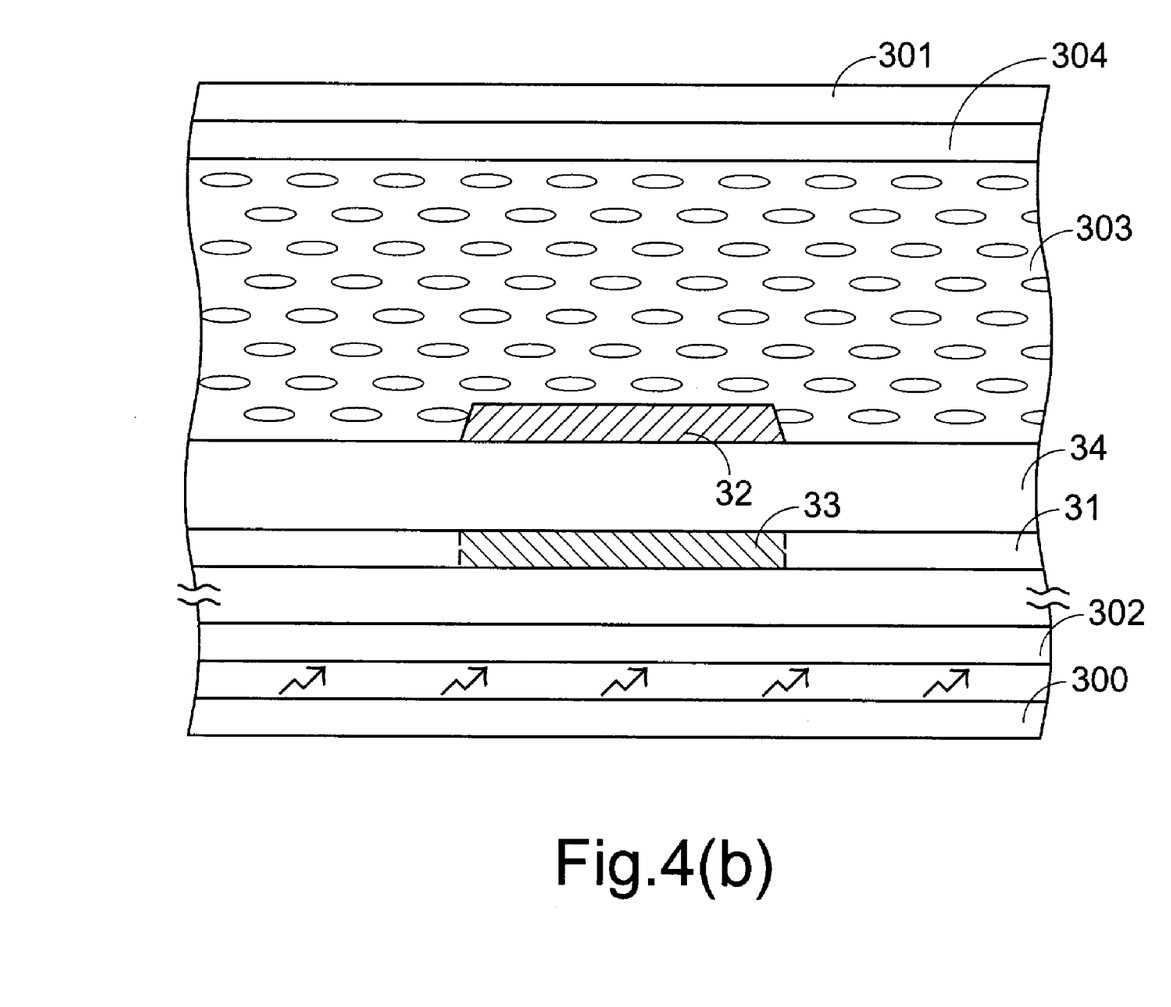
FIG. 4(b) is a cross-sectional view of the transflective LCD in FIG. 4(a) taken along the line A—A.

Please refer to FIGS. 4(a) and 4(b), which illustrate a pixel cell of a transflective LCD according to another preferred embodiment of the present invention. In this embodiment, the reflective electrode 32 is disposed over the transmissive electrode 31, and the reflective electrode 32 is ungrounded and situated in a floating state. The auxiliary electrode 33 in a shape of a solid rectangle is imbedded in the transmissive electrode 31 and aligned with the reflective electrode 32, thereby preventing from a coupling effect generated around the data line or the scan line. The auxiliary electrode 33 is in contact with the transmissive electrode 31 so as to get into electric connection with each other.

Likewise, the transmissive electrode 31 defines a transmissive capacitor device C1 along with the liquid crystal layer 303 and the common electrode 304. The reflective electrode 32 defines a reflective capacitor device C2 along with the liquid crystal layer 303 and the common electrode 304. Moreover, the dielectric layer 34 defines an auxiliary capacitor device C3 along with the auxiliary electrode 33 and the reflective electrode 32. The similar circuitry as shown in FIG. 3(c) can be achieved.

Figure 5A:
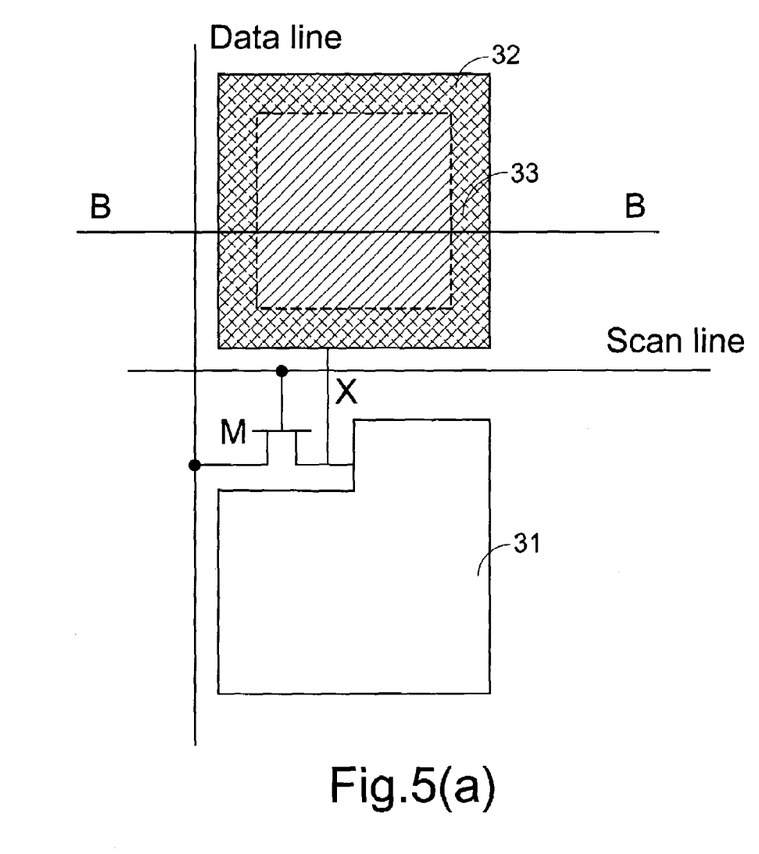
FIG. 5(a) is a schematic diagram showing a top plane view of a pixel cell of a transflective LCD according to another preferred embodiment of the present invention.
Figure 5B:
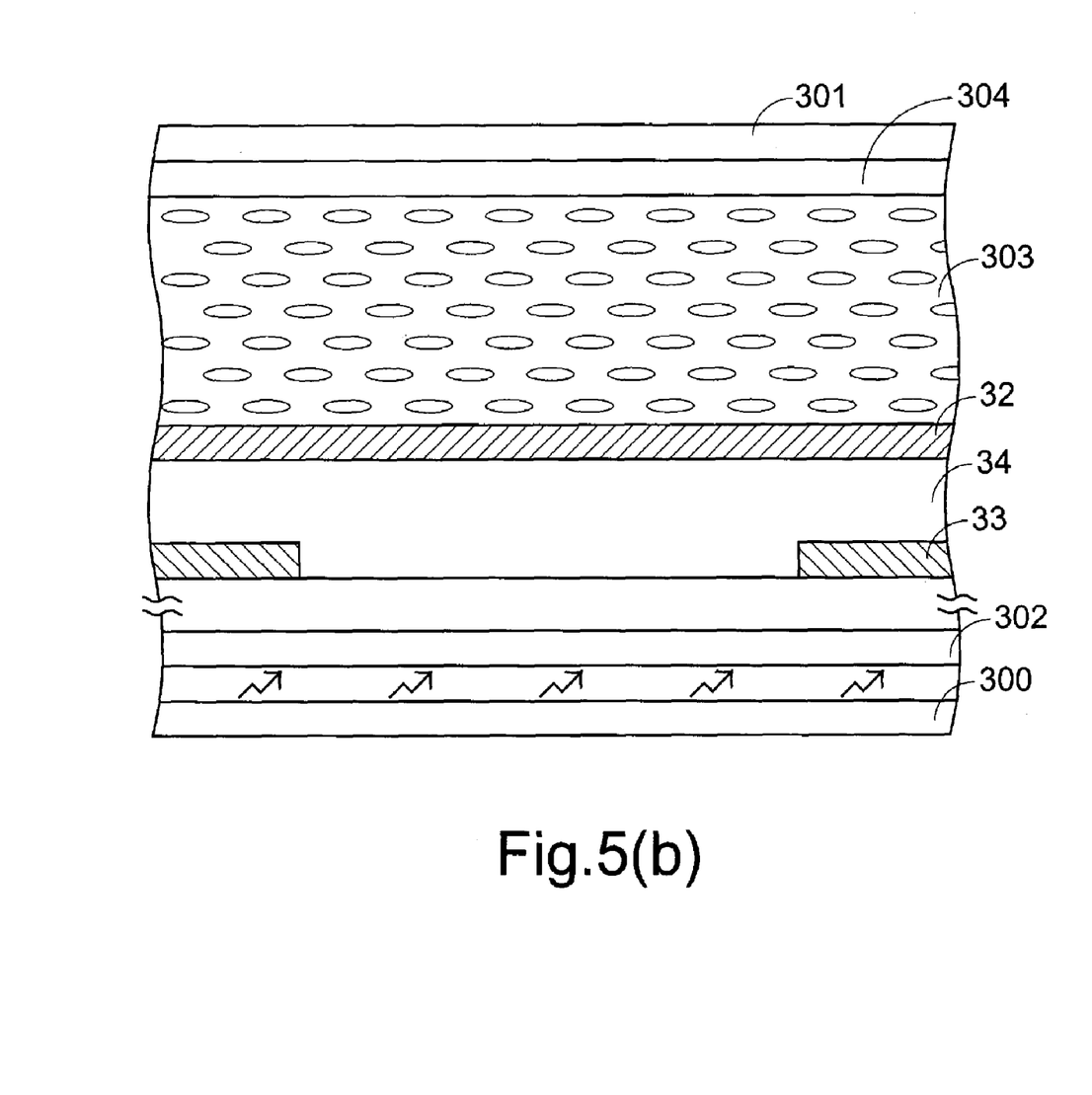
FIG. 5(b) is a cross-sectional view of the transflective LCD in FIG. 5(a) taken along the line B—B.

Please refer to FIGS. 5(a) and 5(b), which illustrate a pixel cell of a transflective LCD according to another preferred embodiment of the present invention. The structure of the pixel cell shown in FIG. 5 is similar to that of FIG. 3, except that the auxiliary electrode 33 is in a shape of a hollow ring. Likewise, the transmissive capacitor device C1, the reflective capacitor device C2 and the auxiliary capacitor device C3 are defined by means of the above-described arrangement. Therefore, even brightness for the transmissive portion and the reflective portion can be obtained by achieving the similar circuitry as shown in FIG. 3(c).

The reflective electrode 32 mentioned above, for example, can be made of aluminum (Al), silver (Ag) or aluminum-neodymium (Al—Nd) alloy. The transmissive electrode 31 and the auxiliary electrode 33 can be made of indium tin oxide (ITO) or indium zinc oxide (IZO). Each of the upper transparent substrate 301 and the lower transparent substrate 302 is made of glass substrate. The dielectric layer 34 is generally made of an insulating material such as silicon nitride, silicon oxide or a combination thereof.

Figure 6A:
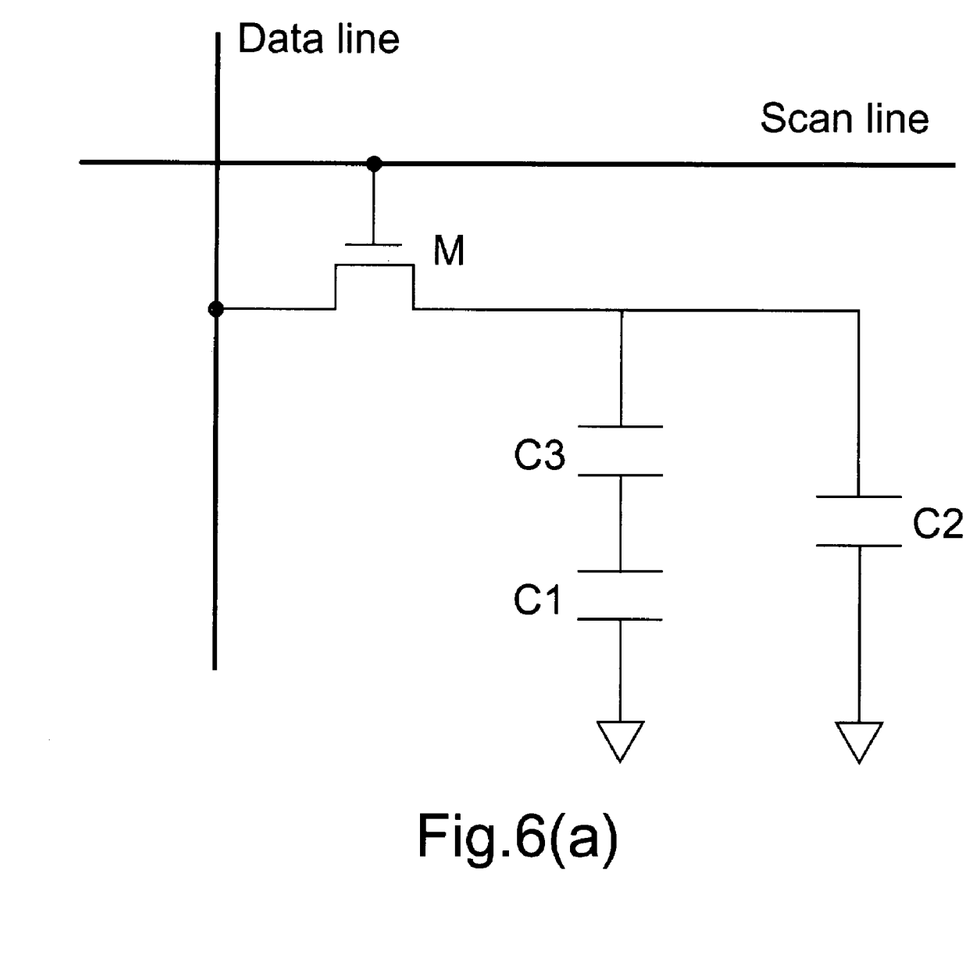
FIG. 6(a) is a schematic circuit diagram illustrating the configuration of the pixel cell according to a further preferred embodiment of the present invention.

In an alternative case that the operation voltage of the transmissive capacitor device C1 is lower than that of the reflective capacitor device C2, the auxiliary capacitor device C3 is electrically connected the transmissive capacitor device C1 in series, and further to the reflective capacitor device C2, as can be seen in FIG. 6(a).

Figure 6B:
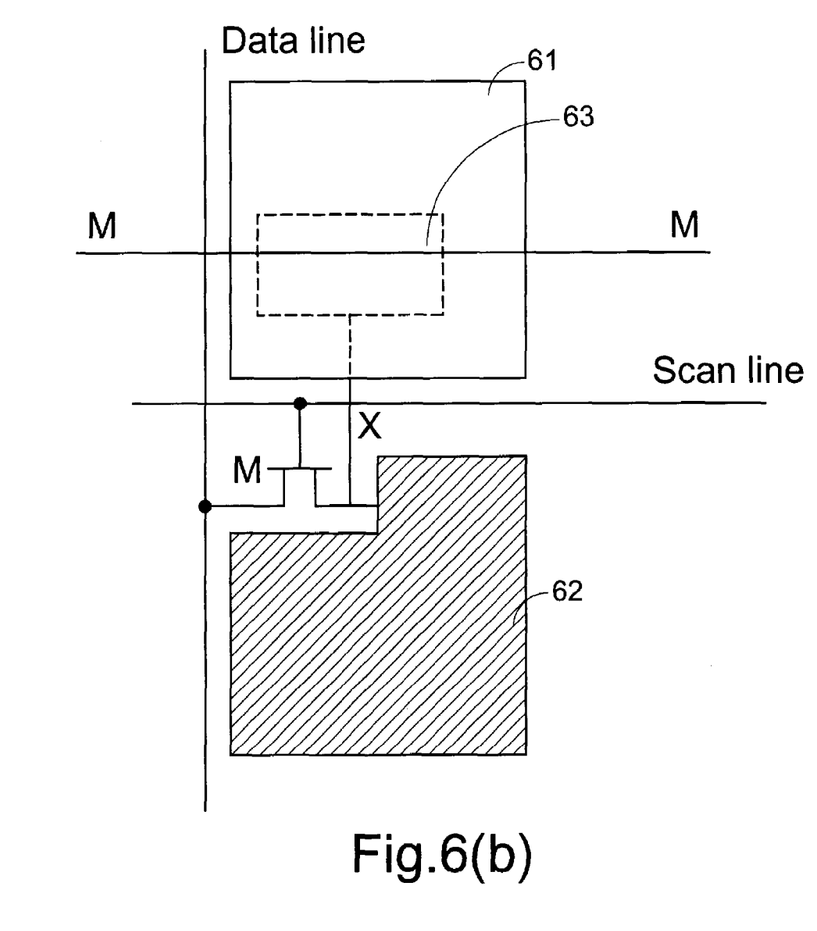
FIG. 6(b) is a schematic diagram showing a top plane view of a pixel cell of a transflective LCD corresponding to the circuit of FIG. 6(a)

The pixel cell of the transflective LCD comprises a data line, a scan line, a transmissive capacitor portion C1 and a reflective capacitor portion C2 disposed between an upper transparent substrate 601 and a lower transparent substrate 602. In addition, a backlight source 600 is disposed under the lower transparent substrate 602 for providing source light for the transmission-related zone. The data line is employed for transmitting a data voltage signal. Via the scan line, the thin film transistor (TFT) M is controlled in either a switching-on or switching-off state. The transmissive capacitor portion C1 comprises of a transmissive electrode 61 electrically connected to the data line, a common electrode 604 above the transmissive electrode 61, and liquid crystal molecules 603 sandwiched between the electrodes. The reflective capacitor portion C2 comprises the common electrode 604, the liquid crystal layer 603 and a reflective electrode 62. For the purpose of achieving a uniform brightness effect for the transflective LCD, an auxiliary capacitor device C3 is additional provided to be electrically connected to the transmissive capacitor device C1 in series, and the serially connected combination is further electrically connected to the reflective capapcitor device C2 in parallel.

Figure 6C:
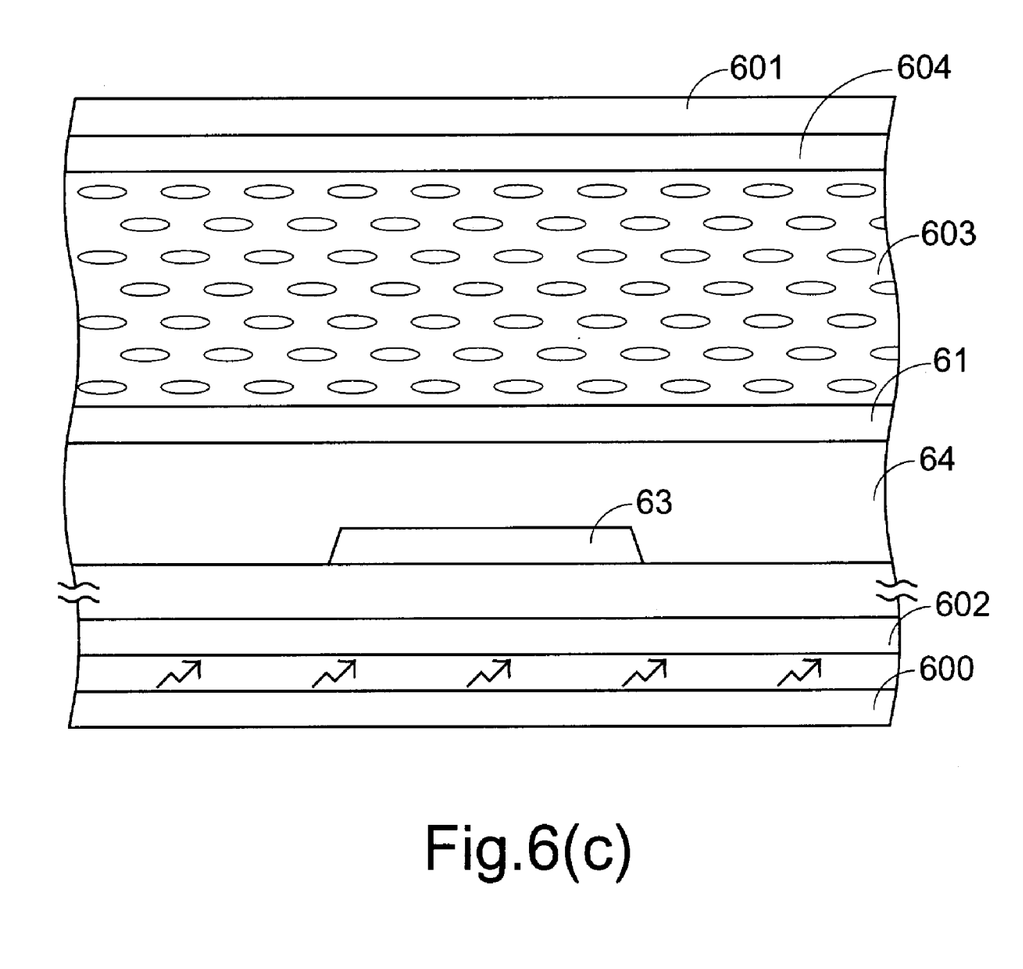
FIG. 6(c) is a cross-sectional view of the transmissive portion in FIG. 6(b) taken along the line M—M.

In this embodiment, referring to FIG. 6(c), the auxiliary capacitor device C3 is defined by the transmissive electrode 61, an auxiliary electrode 63, and a dielectric layer 64 between the electrodes. The auxiliary electrode 63 is formed on the lower transparent substrate 602 and connected to the reflective electrode 62 via a conducting line X (FIG. 6(a)) so as to have a potential equal to the reflective electrode 62. It is to be noted that the auxiliary electrode 63 is preferably light transmissive so as not to block the transmissive electrode 61 thereabove from the light from the backlight source 600.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A liquid crystal display comprising:
    a common electrode;
    a liquid crystal layer comprising a plurality of liquid crystal molecules;
    a data line for transmitting a data voltage signal;
    a transmissive electrode electrically connected to said data line and defining a first capacitor device along with said liquid crystal layer and said common electrode, said first capacitor working under a first operation voltage;
    a reflective electrode defining a second capacitor device along with said liquid crystal layer and said common electrode, said second capacitor working under a second operation voltage;
    an auxiliary electrode electrically connected to said transmissive electrode and electrically isolated from said reflective electrode; and
    a dielectric layer disposed between said auxiliary electrode and said reflective electrode and defining a third capacitor device along with said auxiliary electrode and said reflective electrode,
    wherein said third capacitor device is electrically connected to said second capacitor device in series for adjusting the voltages applied to said first capacitor and said second capacitor to reach said first operation voltage and said second operation voltage, respectively.

2. The liquid crystal display according to claim 1 wherein said reflective electrode is made of a material selected from a group consisting of aluminum (Al), silver (Ag) and aluminum-neodymium (Al—Nd) alloy, and said transmissive electrode is made of a material selected from a group consisting of indium tin oxide (ITO) and indium zinc oxide (IZO).

3. The liquid crystal display according to claim 2 wherein said auxiliary electrode is made of a material selected from a group consisting of indium tin oxide (ITO) and indium zinc oxide (IZO).

4. The liquid crystal display according to claim 1 wherein said data line is electrically connected to the drain electrode of a thin film transistor and further to said transmissive electrode.

5. The liquid crystal display according to claim 1 wherein said auxiliary electrode is integrally defined with said transmissive electrode.

6. The liquid crystal display according to claim 1 wherein said auxiliary electrode is electrically connected to said transmissive electrode via a conducting line, and disposed at a side of said reflective electrode opposite to said common electrode.

7. The liquid crystal display according to claim 1 wherein said auxiliary electrode is of a shape selected from one of a solid rectangle and a hollow ring.

8. The liquid crystal display according to claim 1 wherein said reflective electrode is disposed over said transmissive electrode, and said auxiliary electrode is imbedded in said transmissive electrode and aligned with said reflective electrode.

9. The liquid crystal display according to claim 1 further comprising a backlight disposed at a side of said transmissive electrode opposite to said liquid crystal layer.

10. The liquid crystal display according to claim 1 further comprising a first transparent substrate disposed above said common electrode.

11. The liquid crystal display according to claim 10 further comprising a second transparent substrate disposed under said transmissive electrode.

* * * * *